United States Patent
Fukuda et al.

(10) Patent No.: US 6,697,163 B2
(45) Date of Patent: Feb. 24, 2004

(54) SHAPE MEASURING APPARATUS

(75) Inventors: Masahiro Fukuda, Ashiya (JP); Hitoshi Kamezawa, Kyoto (JP); Kyouichi Hirouchi, Sakai (JP)

(73) Assignee: Minolta Co., Ltd., Osaka (JP)

( * ) Notice: Subject to any disclaimer, the term of this patent is extended or adjusted under 35 U.S.C. 154(b) by 254 days.

(21) Appl. No.: 09/761,638

(22) Filed: Jan. 18, 2001

(65) Prior Publication Data
US 2001/0024280 A1 Sep. 27, 2001

(30) Foreign Application Priority Data
Jan. 20, 2000 (JP) .......................... 2000-014257

(51) Int. Cl.[7] .................. G01B 11/24; G01B 11/30
(52) U.S. Cl. .................. 356/609; 356/601; 356/602
(58) Field of Search .............................. 356/601, 602, 356/609, 625, 627

(56) References Cited

U.S. PATENT DOCUMENTS

| | | | | |
|---|---|---|---|---|
| 4,017,188 A | * | 4/1977 | Sawatari | 356/600 |
| 4,088,408 A | * | 5/1978 | Burcher et al. | 356/600 |
| 4,548,504 A | * | 10/1985 | Morander | 356/623 |
| 4,639,140 A | * | 1/1987 | Lerat | 356/609 |
| 4,930,896 A | * | 6/1990 | Horikawa | 356/609 |
| 5,033,856 A | * | 7/1991 | Nose et al. | 356/609 |
| 5,424,834 A | * | 6/1995 | Akedo et al. | 356/609 |
| 6,452,686 B1 | * | 9/2002 | Svetkoff et al. | 356/602 |

FOREIGN PATENT DOCUMENTS

| | | |
|---|---|---|
| JP | 9-326902 | 12/1997 |
| JP | 10-234050 | 9/1998 |

* cited by examiner

Primary Examiner—Rodney Fuller
(74) Attorney, Agent, or Firm—McDermott, Will & Emery

(57) ABSTRACT

A shape measuring apparatus for measuring an outer surface of a measurement object, includes: a photo-sensor unit including two photo-sensors each provided with a number of pixels, first and second signal processing sections which executes combination processing to light reception signals outputted from the photo-sensors. The first signal processing section includes a corrector for correcting errors of light reception signals from one photo-sensor with respect to light reception signals from another photo-sensor in the incident direction or the direction perpendicular to the incident direction based on the relative displacement stored in the displacement memory. The second signal processing section includes a corrector for correcting the relative displacement by delaying the sending of the reception signals from one photo-sensor with respect to the sending of the reception signals from another photo-sensor. The first and second signal processing sections are selectively changed over.

21 Claims, 10 Drawing Sheets

PRIOR ART       FIG.12
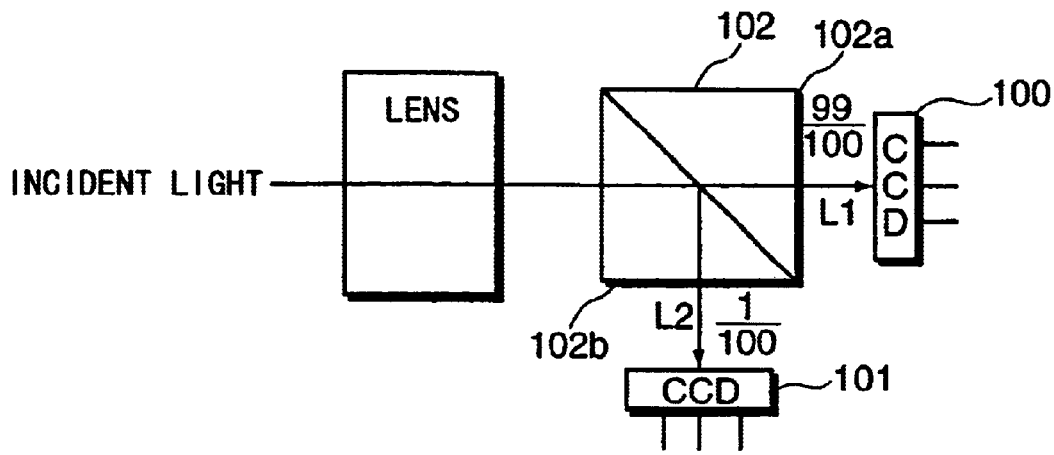
FIG.13
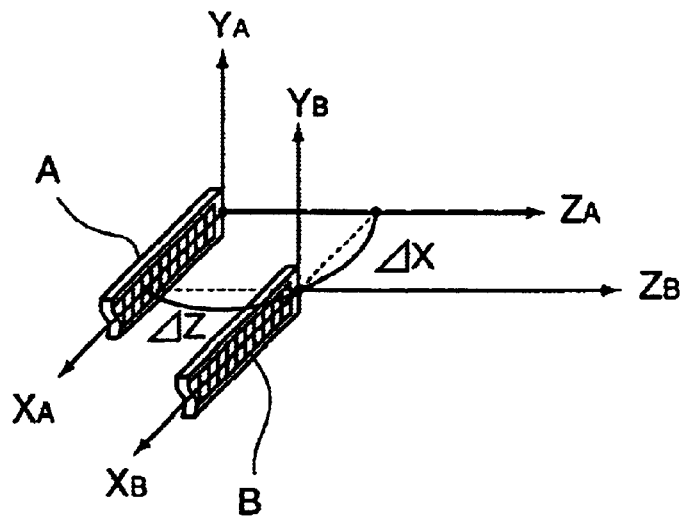

SHAPE MEASURING APPARATUS

This application is based on patent application No. 2000-14257 filed in Japan, the contents of which are hereby incorporated by references.

BACKGROUND OF THE INVENTION

This invention relates to a shape measuring apparatus for measuring an outer surface configuration of an object by reduction scanning and specifically to a technique of correcting a relative displacement between two photo-sensors provided in a photo-sensor unit of a shape measuring apparatus to enlarge a dynamic range.

As shown in FIG. 12, there is known a method for enlarging the dynamic range of CCDs (Charge-Coupled Devices) which uses two CCDs 100, 101 and a semitransparent prism 102 having a large light amount splitting ratio (hereinafter, this method is referred to as a dual CCD system).

According to this system, the CCDs 100, 101 are so arranged as to face two mutually orthogonal emerging surfaces 102a, 102b of the semitransparent prism 102, the light amount of an incident light beam is split at a large ratio of, e.g., L1:L2=99:1 by the semitransparent prism 102 so as to focus a bright image and a dark image on the CCDs 100, 101, respectively, and the dynamic range is enlarged by combining the images separately sensed by the two CCDs 100, 101.

Since the amount of incident light is suppressed to L2/(L1+L2)=0.01 in the CCD 101, light can be sensed even if the amount of incident light exceeds the photo-sensing sensitivity of the CCD 100. Accordingly, the image sensed by the CCD 100 is used when the amount of incident light lies within the photo-sensing sensitivity of the CCD 100, whereas the two sensed images are combined to use the image sensed by the CCD 101 by adjusting the brightness by multiplying it by (L1+L2)/L2, thereby enlarging the dynamic range of the CCDs when the amount of incident light exceeds the photo-sensing sensitivity of the CCD 100.

Since the two photo-sensors (CCDs) are used in the conventional dynamic range enlarging method, photo-sensing characteristics of the two photo-sensors and the photo-sensing positions of the photo-sensors need to be adjusted. As a method for adjusting the photo-sensing positions is known the one according to which two photo-sensors are respectively provided with mechanical position adjusting mechanisms and the positions of the respective photo-sensors are adjusted using these position adjusting mechanisms. This method is a position adjusting method by hardware.

The mechanical position adjusting mechanisms are excellent in guaranteeing the positional precision of the photo-sensors by mechanical precision, but are required to have a high precision of adjustment in the order of $\mu$m and need to be complicated adjusting mechanisms adjustable in directions of six axes. This brings about problems of difficult position adjustment, larger size, and high price. To this end, a method has been proposed according to which a relative displacement of two photo-sensors actually mounted is measured at the time of production, the measured displacement is stored as a correction value in a memory, an error resulting from the displacement of the photo-sensors is corrected by the correction value when light reception data sensed by the photo-sensors are processed. This method is a position adjusting method by software.

The position adjusting method by software reduces a burden caused by the mounting construction of the photo-sensors, but calculation needs to be made for correction using the correction value every time the light reception data of the photo-sensors are processed. This increases a burden on data processing performed in a CPU (Central Processing Unit).

The shape measuring apparatus for measuring an outer surface configuration of an object to be measurement or a measurement object is provided with a photo-sensor formed of a line sensor arranged in parallel to X-direction if it is assumed that a height direction (vertical direction) of the measurement object is Y-direction, a direction of a line connecting the shape measuring apparatus and the measurement object is Z-direction, and a direction normal to Y-direction and Z-direction is X-direction. The apparatus is placed at a specified height position (specified Y-coordinate position) with respect to the measurement object, light reflected by the measurement object is sensed by the photo-sensor, distances (corresponding to Z-coordinates) from the measuring apparatus (precisely from the photo-sensor) to the outer surface of the measurement object are measured for the respective pixels (for the respective X-coordinate positions). In this way, three-dimensional data (X, Y, Z) of the outer surface of the measurement object are measured at specified measurement intervals.

Since high-precision measurement is made by reduction scanning in the shape measuring apparatus, a photo-sensor having a high sensitivity and a wide dynamic range is required. However, a desired dynamic range cannot sometimes be obtained with presently commercially available photo-sensors. In such a case, a dynamic range enlarging method as described above needs to be adopted.

In the case of adopting the dual CCD system, the displacement between the two line sensors causes a problem as described above. Particularly, a displacement in a pixel aligning direction (X-direction) of the line sensor largely influences a measurement accuracy since the respective pixel positions correspond to X-coordinates of measurement points, and light reception signals at different pixel positions are combined when the light reception signals of the two line sensors A, B are switchingly combined.

FIG. 14 is a diagram showing an influence on the measurement accuracy when the two line sensors are displaced in the pixel aligning direction. In FIG. 14, a black-and-white strip CH at the uppermost stage is a test chart, and two strips A, B therebelow are line sensors. It should be noted that a1, a2, ... a12 within the line sensor A and b1, b2, ... b12 within the line sensor B represent pixels, which have a sensitivity characteristic as shown in FIG. 15. As shown in FIG. 14, the line sensors A, B are displaced from each other by one pixel in the pixel aligning direction. A white area (brightness level $B_H$) and a black area (brightness level $B_L$) of the test chart CH are sensed by the pixels a1 to a6 and the pixels a7 to a12 in the line sensor A, respectively. On the other hand, the white area and the black area are sensed by the pixels b1 to b5 and the pixels b6 to b12 in the line sensor B.

In FIG. 14, an upper graph shows the output level of the line sensor A, a middle graph shows the output level of the line sensor B, and a lower graph shows a combination of the output levels of the line sensors A and B. The amount of incident light on the line sensor B is 1/N of that on the line sensor A. In the lower graph, the output level of the line sensor B is combined with that of the line sensor A after being multiplied by N.

Since the brightness level $B_H$ of the white area exceeds a maximum output level Vmax of the line sensor A as shown in FIG. 15, the output levels of the pixels a1 to a6 of the line sensor A are saturated at the maximum output level Vmax, and the output levels of the pixels a7 to a12 are at $V_L$ corresponding to the brightness level $B_L$ of the black area. On the other hand, since the amount of incident light is gradually reduced to 1/N in the line sensor B, the output levels of the pixels b1 to b5 are at an output level $V_H/N$ corresponding to the brightness level $B_H/N$, and the output levels of the pixels b6 to b12 are saturated at a minimum output level Vmin.

According to the dual CCD system, the output levels of the pixels a1 to a6 of the line sensor A are combined by being replaced by the output levels of the corresponding pixels b1 to b6 of the line sensor B since they are saturated. However, as shown in the lower graph, the output level corresponding to the pixel a6 is substantially missing. As a result, a plurality of light reception signals for calculating Z-coordinates (surface positions of the measurement object) are missing at the X-coordinate position corresponding to the pixel a6, and Z-coordinates at this pixel position cannot be precisely obtained.

Referring back to FIG. 13, a displacement in a direction (Z-direction) normal to the sensing surfaces of the line sensors A and B causes a difference in the amount of the received light between the line sensors A and B. Thus, even in the case that there is no displacement in the pixel aligning direction (X-direction), the output of the line sensor A and that of the line sensor B are mixed in a plurality of light reception signals for calculating Z-coordinates at a certain pixel position if the light reception signals of the line sensor A and those of the line sensor B are switchingly combined. This causes a calculation error of Z-coordinates at this pixel position.

Accordingly, if a light sensing system adopting the dynamic range enlarging method using two CCDs is used in the shape measuring apparatus, a measurement error resulting from the displacement in the pixel aligning direction (X-direction) of the line sensor and a direction of the optical axis of the light incident on the line sensor (Z-direction) need to be particularly reduced.

The conventional displacement adjusting method by hardware for mechanically adjusting the mount positions of the photo-sensors leads to a larger, more complicated and more expensive apparatus due to the adjusting mechanism and, therefore, cannot be readily adopted in the shape measuring apparatus.

If all concerning factors are collectively studied, a method for correcting a measurement error resulting from the displacement by signal processing, calculation processing or a combination of these processings when the light reception data are processed is preferable. However, no shape measuring apparatus adopting the dynamic range enlarging method using two CCDs has been conventionally known. Nor has been proposed a technique of correcting a measurement error resulting from the displacements in a pixel aligning direction of a line sensor and an optical axis direction of incident light by signal processing, calculation processing, etc.

SUMMARY OF THE INVENTION

It is an object of the present invention to provide a shape measuring apparatus which is free from the problems residing in the prior art.

According to an aspect of the present invention, a shape measuring apparatus comprises: at least two photo-sensors for converting received light to electrical light reception signals, one photo-sensor having a photo-sensing characteristic identical to another photo-sensor; a first beam splitter for splitting a light beam in a predetermined light amount ratio, and introducing split light beams to the photo-sensors, respectively; an optical system for introducing a light beam reflected from an object to be measured to the beam splitter, and having a focal point movable in relative to the object; a driver for driving the optical system to move the focal point; and a signal processing section for executing combination processing to light reception signals outputted from the photo-sensors.

The signal processing section is provided with a displacement memory for storing a relative displacement between one photo-sensor and another photo-sensor in an incident direction (or a direction perpendicular to the incident direction); a signal memory for storing light reception signals outputted from each of the photo-sensors; a corrector for correcting errors of light reception signals from one photo-sensor with respect to light reception signals from another photo-sensor in the incident direction (or perpendicular direction) based on the relative displacement stored in the displacement memory, and a signal processor for combining light reception signals from one photo-sensor with light reception signals from another photo-sensor by replacing light reception signals from a saturated part of one photo-sensor with light reception signals from a corresponding part of another photo-sensor.

According to another aspect of the present invention, a shape measuring apparatus comprises: at least two photo-sensors, each photo-sensor including a number of pixels arranged in a specified direction for converting received light to electrical light reception signals, one photo-sensor having a photo-sensing characteristic identical to another photo-sensor; a beam splitter for splitting a light beam in a predetermined light amount ratio, and introducing split light beams to the photo-sensors, respectively; an optical system for introducing a light beam reflected from an object to be measured to the beam splitter, and having a focal point movable in relative to the object; a driver for driving the optical system to move the focal point; first and second signal processing sections for executing combination processing to light reception signals outputted from the photo-sensors in their respective manners; a changer for changing over the first signal processing section and the second signal processing section; a mode setter for switchingly setting a first measurement mode and a second measurement mode; and a controller responsive to the mode setter for rendering the first signal processing section execute the combination processing when the first measurement mode is set, and rendering the second signal processing section execute the combination processing when the second measurement mode is set.

The first signal processing section includes a displacement memory for storing a relative displacement between one photo-sensor and another photo-sensor in the pixel arrangement direction (or incident direction perpendicular to the pixel arrangement direction), a signal memory for storing light reception signals outputted from each of the photo-sensors, a corrector for correcting errors of light reception signals from one photo-sensor with respect to light reception signals from another photo-sensor in the pixel arrangement direction (or the incident direction) based on the relative displacement stored in the displacement memory, and a signal processor for combining light reception signals from one photo-sensor with light reception signals from another photo-sensor by replacing light reception signals from saturated pixels of one photo-sensor with light reception signals from corresponding pixels of another photo-sensor.

The second signal processing section includes a corrector for correcting a relative displacement between one photo-sensor and another photo-sensor in the pixel arrangement direction (or the incident direction) by a pitch of pixel by delaying the sending of the reception signals from one photo-sensor with respect to the sending of the reception signals from another photo-sensor, and a signal processor for combining light reception signals from one photo-sensor with light reception signals from another photo-sensor by replacing light reception signals from saturated pixels of one photo-sensor with light reception signals from corresponding pixels of another photo-sensor.

These and other objects, features and advantages of the present invention will become more apparent upon a reading of the following detailed description and accompanying drawings.

BRIEF DESCRIPTION OF THE DRAWINGS

FIG. 12 is a diagram showing a dynamic range enlarging method using two CCDs;

FIG. 13 is a diagram showing relative displacements of two CCD line sensors in X-direction and Z-direction;

DETAILED DESCRIPTION OF THE PREFERRED EMBODIMENTS OF THE INVENTION

Figure 1:
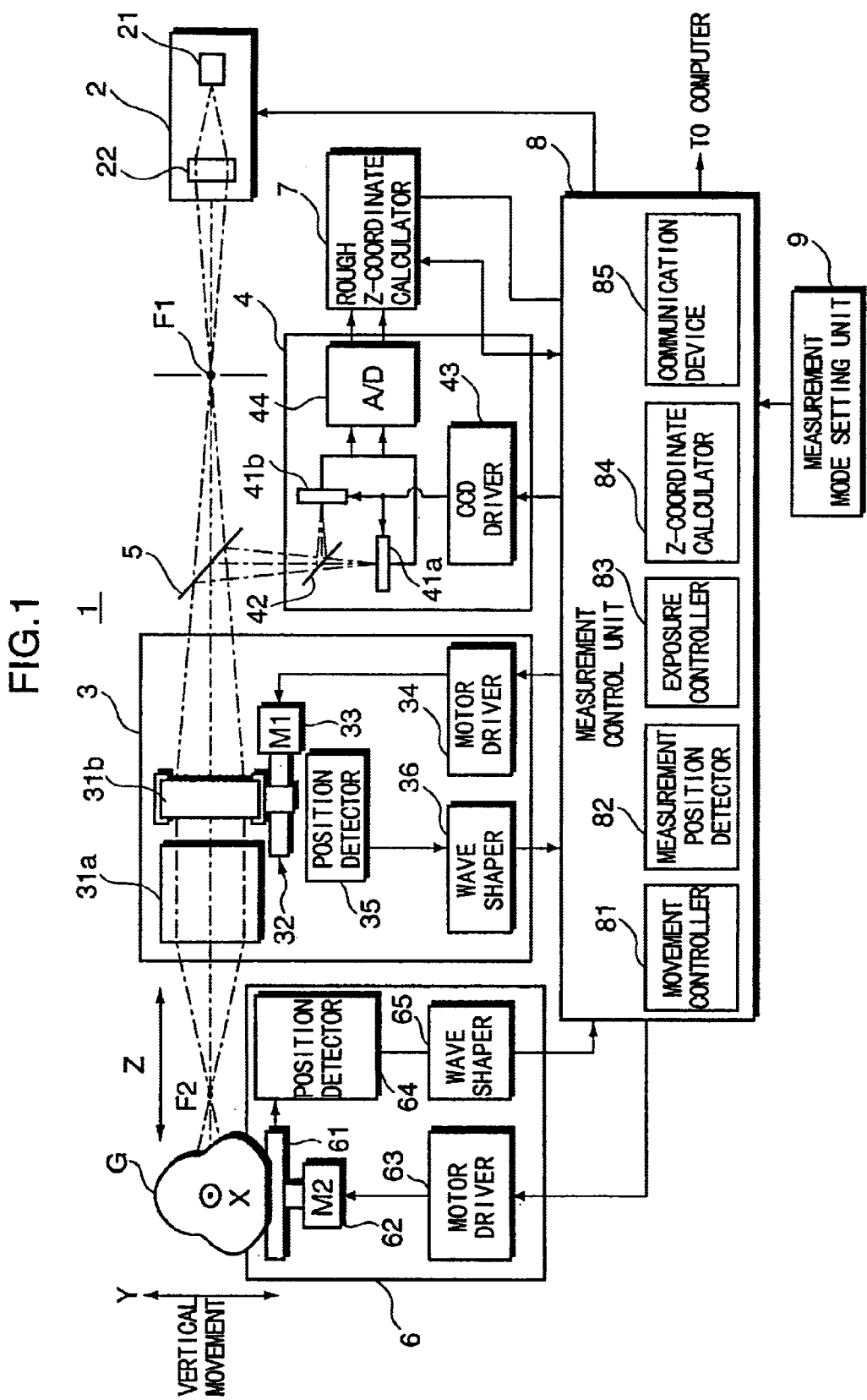
FIG. 1 is a block diagram showing a construction of a shape measuring apparatus according to an embodiment of the invention.

Referring to FIG. 1 showing a construction of a shape measuring apparatus according to an embodiment of the invention, a shape measuring apparatus 1 measures an outer surface configuration of a measurement object G using a conjugate autofocus system. The shape measuring apparatus 1 is basically provided with an illumination unit 2 for producing an illumination light, a confocal optical system 3, a photo-sensor unit 4, a beam splitter 5, a Y-direction driving unit 6, a rough Z-coordinate calculator 7, and a measurement control unit 8. The confocal optical system 3 (hereinafter, merely "optical system 3") projects illumination light from the illumination unit 2 onto the measurement object G. The photo-sensor unit 4 receives reflected light of the illumination light from the measurement object G having transmitted through the confocal optical system 3 and outputs an electrical signal (hereinafter, "light reception signal") by photoelectrically converting the received light. The beam splitter 5 splits the reflected light of the illumination light from the measurement object G having transmitted through the optical system 3 and introduces part thereof to the photo-sensor unit 4. The Y-direction driving unit 6 relatively moves the measurement object G in vertical direction (Y-direction) with respect to the shape measuring apparatus 1. The rough Z-coordinate calculator 7 calculates rough coordinates (Z-coordinates) of the outer surface of the measurement object G using the light reception signal outputted from the photo-sensor unit 4. The measurement control unit 8 controls the operations of the above respective units and calculates three-dimensional shape data of the outer surface of the measurement object G.

The three-dimensional shape of the measurement object G is measured by placing the measurement object G on a measurement table 61 in the Y-direction driving unit 6 arranged in front of the shape measuring apparatus 1 and measuring projections and recesses of the measurement object G at each height position while elevating and lowering the measurement table 61 at specified intervals in height direction (Y-direction). In other words, the three-dimensional shape of the measurement object G is measured by measuring Z-coordinates of the outer surface of the measurement object G at each Y-coordinate while changing the Y-coordinate of the measurement object G at specified intervals if Y-direction, Z-direction and X-direction are assumed to be a height direction of the measurement object G, an optical axis direction of the optical system 3 and a direction normal to Y-direction and Z-direction.

The shape measuring apparatus 1 is provided with photoelectric converting devices formed of line sensors arranged in parallel to X-axis as described above, and measures Z-coordinates of the outer surface of the measurement object G using a light reception signal obtained by the respective pixels of the photoelectric converting devices. In other words, the respective pixels of the photoelectric converting devices correspond to X-coordinates, and the Z-coordinates in all X-coordinate positions on each Y-coordinate are simultaneously measured.

Figure 3:
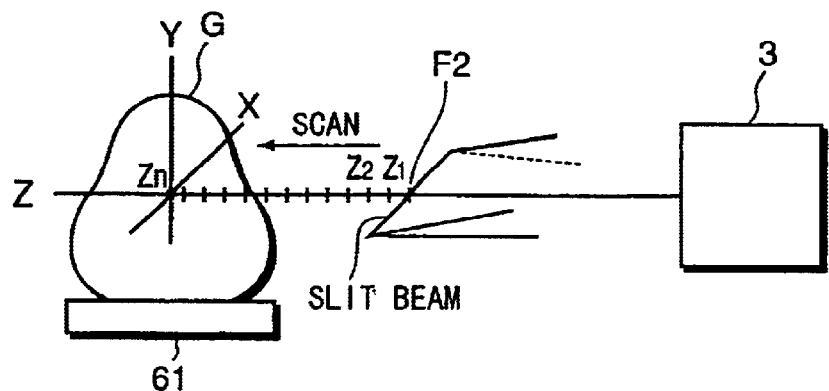
FIG. 3 is a diagram showing a method for measuring an outer surface configuration of a measurement object by a conjugate autofocus system.

The Z-coordinates of the outer surface of the measurement object G are measured as follows. First, illumination light linear in X-direction is emitted from the illumination unit 2 arranged at the image side of the optical system 3. This illumination light is converged at an object-side focal point F2 of the optical system 3 as shown in FIG. 3, whereby forming a linear light beam (hereinafter, "slit beam") extending in a direction parallel to X-direction at the focal point F2.

Subsequently, while the object-side focal point F2 (i.e., the slit beam) of the optical system 3 is moved along the optical axis direction in this state until reaching the inside of the measurement object G, photo-sensors 41a, 41b in the photo-sensor unit 4 are repeatedly exposed in a specific cycle. In other words, an image of the measurement object G is repeatedly picked up at specified coordinate positions $Z_1, Z_2, \ldots Z_n$ on Z-axis.

Figure 4:
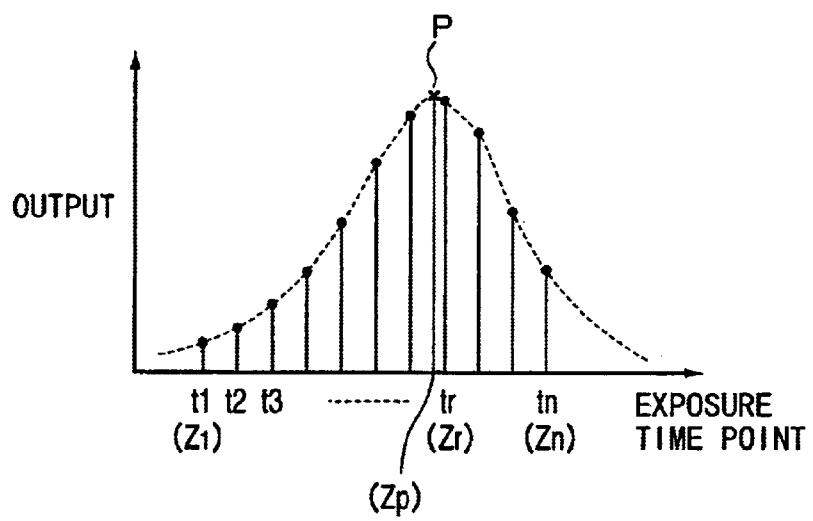
FIG. 4 is a graph showing an exemplary signal waveform when reflected light from the measurement object is cyclically sensed while moving a slit beam converged at an object-side focal point of an optical system closer to the measurement object.

By these image pickup operations, light reception signals are obtained in the respective Z-coordinate positions as shown in FIG. 4. Using these light reception signals, an exposure position (Z-coordinate $Z_P$ corresponding to point P in FIG. 4) on the optical axis where the output of the light reception signal is at its maximum is calculated for each pixel (corresponding to X-coordinate) of the photo-sensors 41a, 41b in the rough Z-coordinate calculator 7 and a Z-coordinate calculator 84 in the measurement control unit 8, and this position is assumed to be a Z-coordinate of one point of the outer surface of the measurement.

Referring back to FIG. 1, the illumination unit 2 produces illumination light to be projected onto the measurement object G. This illumination light is a slit beam extending in X-direction such that the reflected light from the measurement object G can be incident on the entire photoelectric converting device. The illumination unit 2 includes a laser generator 21 and an illumination optical system 22. A laser beam (spot light) generated in the laser generator 21 is converted into a slit beam extending in X-direction by the illumination optical system 22 and is incident on the optical system 3 via the beam splitter 5 after being focused at an image-side focal point F1 of the optical system 3.

The optical system 3 projects the illumination light received from the illumination unit 2 onto the measurement object G, and introduces the illumination light reflected by the outer surface of the measurement object G to the photo-sensor unit 4 via the beam splitter 5.

The optical system 3 is comprised of two lens groups: a front lens group 31a and a rear lens group 31b which serves as a focusing lens for moving the object-side focal point F2. The rear lens group 31b is made movable forward and backward on the optical axis by an actuator 32. The actuator 32 translates a rotary motion of an electric motor 33 such as a stepping motor into a linear motion, and the rear lens group 31b moves forward and backward on the optical axis by a torque of the electric motor 33 transmitted via the actuator 32. The operation of the electric motor 33 is controlled by a motor driver 34, and the drive of the electric motor 33 is substantially controlled by the measurement control unit 8.

The actuator 32 is provided with a position detector 35 for detecting the position of the rear lens group 31b. The position detector 35 is comprised of, for example, an optical sensor mounted at a movable member of the actuator 32 and a linear scale mounted on a fixed member of the actuator 32, and the optical sensor reads a gauge of the linear scale as the movable member of the actuator 32 moves. A sine-wave signal is outputted from the position detector 35. This output signal is inputted to the measurement control unit 8 after having its waveform shaped into a rectangular wave in a wave shaper 36.

In the measurement control unit 8, the position of the rear lens group 31b, i.e., the focal point F2 on the optical axis is detected using the rectangular-wave signal received from the position detector 35. The illumination light emerged from the optical system 3 is gathered at the focal point F2 as described above, where a slit beam extending in X-direction is formed (see FIG. 3). Accordingly, the slit beam is moved on the optical axis by moving the rear lens group 31b on the optical axis. The amount of the light incident on the photo-sensor unit 4 is at its maximum when this slit beam is reflected by the outer surface of the measurement object G.

The rough Z-coordinate calculator 7 and the measurement control unit 8 calculate the Z-coordinates of the measurement object G by calculating the position of the rear lens group 31b, i.e., the focal point F2 where the signal level is at its maximum using a plurality of light reception signals (see FIG. 4) inputted from the photo-sensor unit 4.

The photo-sensor unit 4 receives the reflected light from the measurement object G inputted via the beam splitter 5. The photo-sensor unit 4 includes photo-sensors (hereinafter, "line sensors") formed of two CCD line sensors, a beam splitter 42 for splitting the incident beam into halves and introducing the split beams to the line sensors 41a, 41b, a CCD driver 43 for controlling the light detection (storing of electric charges through exposure and readout of stored electric charges) of the line sensors 41a, 41b, and an analog-to-digital (A/D) converter 44 for applying specified signal processings (noise removal, level adjustment, etc.) to light reception signals read from the line sensors 41a, 41b to convert them to digital signals and outputting the resulting digital signals. Although a semitransparent mirror is used as a beam splitter in this embodiment, an other optical member such as a semitransparent prism may also be used.

The two line sensors 41a, 41b and the beam splitter 42 are members for enlarging the dynamic ranges of the line sensors by the aforementioned dual CCD system. The beam splitter 42 is provided on an optical axis of the light reflected by the beam splitter 5; the line sensor 41a on a light path of the light having transmitted through the beam splitter 42, the line sensor 41b on a light path of the light reflected by the beam splitter 42. In other words, the beam splitter 42, the line sensors 41a, 41b are provided in positions conjugate with the image-side focal point F1 of the optical system 3, respectively.

The sensing positions of the line sensors 41a, 41b need to accurately coincide with each other according to the dynamic range enlarging method by the dual CCD system. In this embodiment, a displacement in a direction (Y-direction) perpendicular to the pixel aligning direction is mechanically adjusted by providing an unillustrated position adjusting mechanism in a sensor mounting portion, and relative displacements $\Delta x$, $\Delta z$ in the pixel aligning direction (X-direction) and a direction (Z-direction) perpendicular to the sensing surfaces of the line sensors 41a, 41b are corrected by applying signal processing to the light reception signals from the line sensors 41a, 41b or performing a calculation using these light reception signals. This correction is described in detail later.

The line sensors 41a, 41b have substantially the same photo-sensing sensitivity. The line sensor 41a is a sensor operated in a usual dynamic range, whereas the line sensor 41b is a sensor operated in an enlarged dynamic range.

Accordingly, in the beam splitter 42, the incident beam is split into two beams at a light amount ratio of B1:B2=N (N>>1):1, and a beam having a light amount B1 is introduced to the line sensor 41a while a beam having a light amount B2 is introduced to the line sensor 41b.

Figure 15:
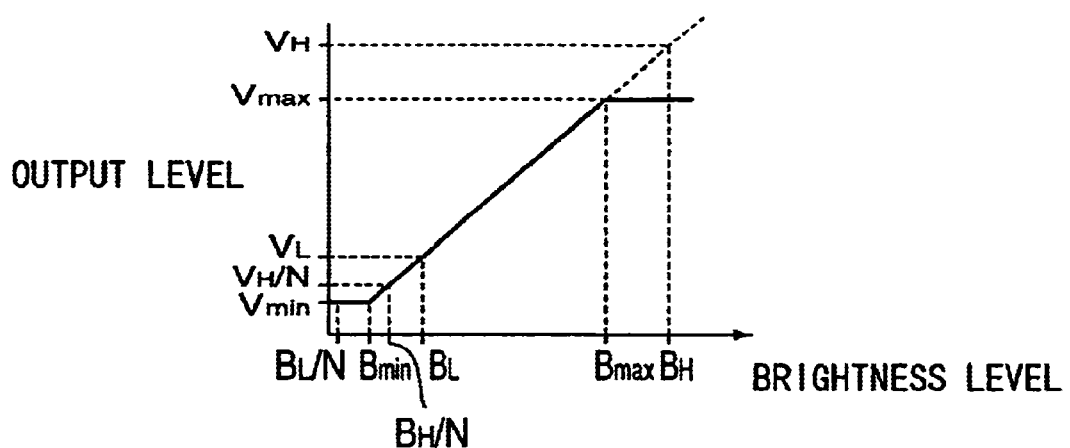
FIG. 15 is a graph showing an exemplary photo-sensing sensitivity of the line sensor.

If the photo-sensing sensitivity characteristic of the line sensors 41a, 41b is, for example, as shown in FIG. 15, the line sensors 41a, 41b can detect incident beams having the light amounts B1, B2 lying within a range between Bmin and Bmax. Accordingly, if it is assumed that, for example, a light amount ratio is B1:B2=99:1 and the light amount of the incident beam is B, the line sensor 41a can detect an incident beam having a light amount of $100 \cdot \text{Bmin} \leq B \leq 100 \cdot \text{Bmax}$, i.e., an incident beam lying within the range between Bmin and Bmax since the light amount B2 of the beam incident on the line sensor 41*b* is 0.01·B. In other words, the line sensor 41*b* can detect an incident beam having 100 times as much as the maximum input level Bmax of the photo-sensing sensitivity.

Accordingly, the photo-sensor unit 4 can detect an incident beam having a light amount ranging from Bmin to 100·Bmax by switching the light reception signals outputted from the line sensor 41*a* and those outputted from the line sensor 41*b* (switching the photo-sensor from the line sensor 41*a* to the line sensor 41*b* when the output level of the line sensor 41*a* exceeds Vmax) according to the light amount of the incident beam.

The line sensors 41*a*, 41*b* are each provided with an electronic shutter function, and exposure (storing of electric charges) and readout of the stored electric charges are controlled by the CCD driver 43. The CCD driver 43 controls the line sensors 41*a*, 41*b* to store electric charges and read out the stored electric charges in accordance with an exposure control signal inputted from the measurement control unit 8.

The exposure control signal inputted from the measurement control unit 8 to the CCD driver 43 is a pulse-train signal having a specific cycle. The CCD driver 43, for example, causes the line sensors 41*a*, 41*b* to start an exposure at a rising time point of this pulse-train signal while causing them to stop the exposure and read out the stored electric charge by the exposure at a falling time point thereof.

The measurement control unit 8 outputs the exposure control signal to the CCD driver 43 at a specified time point upon starting a movement of the focal point F2 (i.e., position of the slit beam) of the optical system 3. Accordingly, an image of the measurement object G is picked up by the line sensors 41*a*, 41*b* a plurality of times at specified moving intervals while the slit beam is moving on the optical axis (i.e., on the Z-axis). The closer the slit beam to the outer surface of the measurement object G, the higher the level of the light reception signals of the line sensors 41*a*, 41*b*. This level is at its maximum when the slit beam coincides with the outer surface of the measurement object G.

The exposure control signal outputted from the measurement control unit 8 is a control signal (signal for controlling exposure time points t1, t2, ... tn of FIG. 4) for sampling the level of the reflected light from the measurement object G which is incident on the line sensors 41*a*, 41*b*. The rough Z-coordinate calculator 7 and the measurement control unit 8 calculate a Z-coordinate ($Z_p$ in FIG. 4) representing the position of the outer surface of the measurement object G based on a change of the level of the reflected light from the measurement object G which is obtained from this control signal, i.e., a change of the output level of the photo-sensor unit 4 shown in FIG. 4.

The A/D converter 4 applies a noise reduction and a level adjustment to the light reception signals (analog signals) read from the line sensors 41*a*, 41*b* to convert them into digital signals, and outputs the resulting digital signals to the rough Z-coordinate calculator 7. At this time, the light reception signal read from the line sensor 41*b* is outputted to the rough Z-coordinate calculator 7 after multiplying its level by N.

The Y-direction driving unit 6 relatively moves the measurement object G along vertical direction with respect to the optical system 3 of the shape measuring apparatus 1. The Y-direction driving unit 6 is provided with the measurement table 61, an electric motor 62, a motor driver 63, a position detector 64 and a wave shaper 65. The measurement table 61 is adapted to place the measurement object G thereon, and is movable upward and downward by a torque of the electric motor 62. The operation of the electric motor 62 is controlled by the motor driver 63, which has the drive thereof controlled by the measurement control unit 8. The position detector 64 detects an elevated position of the measurement table 61, and is comprised of the same members as the position detector 35 of the optical system 3. The wave shaper 65 shapes the waveform of a sine-wave detection signal outputted from the position detector 64, and the wave-shaped detection signal is inputted to the measurement control unit 8.

The rough Z-coordinate calculator 7 roughly detects an exposure position where the levels of a plurality of light reception signals cyclically outputted from the line sensors 41*a*, 41*b* are peaked. Specifically, a plurality of light reception signals as shown in FIG. 4 are obtained by moving the slit beam on the optical axis at each Y-coordinate position of the measurement object G. The rough Z-coordinate calculator 7 calculates a specified number of light reception signals at and near a peak value out of these obtained light reception signals. This processing is performed to reduce the number of the light reception signals used for calculation and to enable high-speed calculation of the exposure position $Z_p$ where the light reception signals are peaked. During the Z-coordinate rough detection, displacements of the line sensors 41*a*, 41*b* in X-direction and Z-direction are also corrected. The construction and functions of the rough Z-coordinate calculator 7 are described in detail later.

The measurement control unit 8 controls the operations of the illumination unit 2, the optical system 3, the Y-direction driving unit 6 and the rough Z-coordinate calculator 7 for the shape measurement of the measurement object G. The measurement control unit 8 is comprised of a microcomputer and provided with a movement controller 81, a measurement position detector 82, an exposure controller 83, a Z-coordinate calculator 84 and a communication device 85 as function blocks.

The movement controller 81 controls the movement of the measurement table 61 in the Y-direction driving unit 6, and controls the movement of the rear lens group 31*b* of the optical system 3. The measurement position detector 82 detects a Y-coordinate of a measurement point in accordance with a signal outputted from the position detector 64 in the Y-direction driving unit 6. The exposure controller 83 controls the exposure time points of the line sensors 41*a*, 41*b* in the photo-sensor unit 4, i.e., the exposure position on the Z-axis. The exposure controller 83 generates an exposure time point signal having a specific cycle in accordance with a signal outputted from the position detector 35 of the optical system 3, and outputs it to the CCD driver 43 in the photo-sensor unit 4.

The Z-coordinate calculator 84 calculates an exposure position (Z-coordinate) where the light reception data at each pixel position is at a peak level using a plurality of light reception data near the peak level which are inputted pixel by pixel from the rough Z-coordinate calculator 7. The Z-coordinate calculator 84 calculates the exposure position (Z-coordinate) where the light reception data is at the peak level by interpolation using a plurality of light reception data.

The communication device 85 outputs the obtained shape data (XYZ-coordinates data) of the measurement object G to an externally connected processing device such as a computer.

A measurement mode setting unit 9 switchingly sets a first measurement mode and a second measurement mode. In the case that the photo-sensor unit 4 adopts the dynamic range enlarging method by the dual CCD system and the relative displacement of the line sensors 41a, 41b is corrected by software, a long time is required for calculation to correct the displacement, resulting in a long measurement time, if importance is attached to a measurement accuracy. In view of such circumstances, the first measurement mode in which a highly accurate measurement is made by accurately correcting the displacement and the second measurement mode in which a high-speed measurement is made by reducing the accuracy of the displacement correction are made selectable by the measurement mode setting unit 9 in the shape measuring apparatus 1 of this embodiment.

An operator can set either one of the measurement modes through the measurement mode setting unit 9 depending on whether he wishes to make a highly accurate measurement or a high-speed measurement even if accuracy is slightly reduced. Mode setting information is inputted to the rough Z-coordinate calculator 7 and is used to control gates GT1 to GT6 by a gate controller 73 to be described later.

Figure 2:
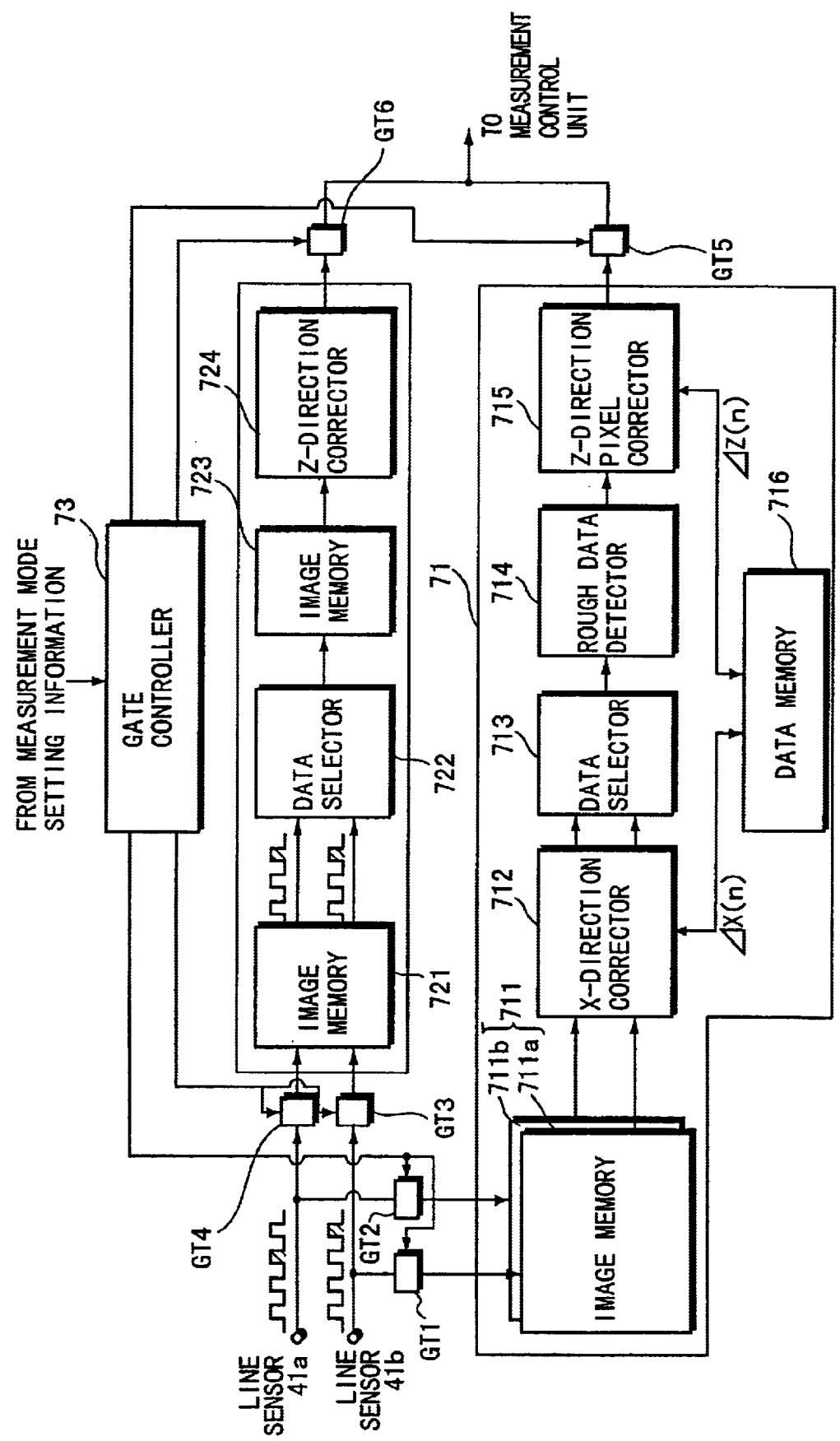
FIG. 2 is a block diagram showing an internal construction of a rough Z-coordinate calculator.

FIG. 2 is a block diagram showing an internal construction of the rough Z-coordinate calculator 7. The rough Z-coordinate calculator 7 is provided with a first data processor 71 for accurately correcting a displacement, a second data processor 72 for correcting a displacement at a high speed, the gates GT1 to GT6 for controlling the input of the light reception data (A/D converted light reception signals) from the photo-sensor 4 to the data processors 71, 72, and the gate controller 73 for controlling the drive of the gates GT1 to GT6.

The first data processor 71 processes the light reception data in the first measurement mode and includes an image memory 711, an X-direction displacement corrector 712, a data selector 713, a rough data detector 714, a Z-direction displacement corrector 715 and a data memory 716.

The image memory 711 is a memory for storing the light reception data outputted from the photo-sensor unit 4 during one scanning by the slit beam. The image memory 711 is comprised of two memories 711a, 711b having the same storage capacity. The light reception data outputted from the line sensor 41a are stored in the memory 711a, whereas the light reception data outputted from the line sensor 41b are stored in the memory 711b.

Figure 5:
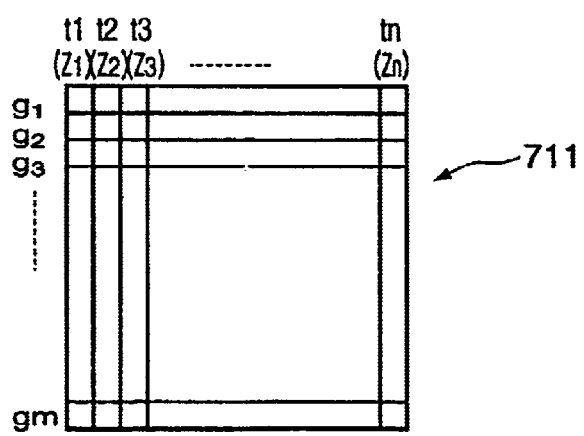
FIG. 5 is a concept diagram showing a storage area of an image memory.

FIG. 5 is a concept diagram of the image memory 711, which has a storage area for storing m×n light reception data. The storage area shown in FIG. 5 assumes a case where m pixels $g_1, g_2, \ldots g_m$ are aligned in each line sensor 41a, 41b, and n exposures are repeated at specified intervals during one scanning by the slit beam.

The line sensors 41a, 41b perform an exposure at exposure time t1, and the light reception data (a group of light reception data pixels $g_1, g_2, \ldots g_m$) read from the photo-sensor unit 4 are stored at the left end column of the image memory 711. Thereafter, the light reception data obtained at exposure time points t2, t3, . . . tn are successively stored in the vertical lines or columns immediately at the right side of the one in which data are previously stored. Accordingly, if a group of the light reception data arranged on a horizontal line or row at the position of an arbitrary pixel $g_r$ are represented by a graph, a sampling data as shown in FIG. 4 can be obtained.

The X-direction displacement corrector 712 corrects a relative displacement Δx of the line sensors 41a, 41b in X-direction. This correction is made by correcting the X-direction displacement Δx of the line sensor 41b from the line sensor 41a, for example, using the position of the line sensor 41a as a reference. The X-direction displacement Δx is measured when the shape measuring apparatus 1 is produced, and stored in the data memory 716.

If it is assumed that $p_x$ denote a pixel pitch at which the pixels are arranged in the line sensors 41a, 41b and the X-direction displacement Δx of the line sensor 41b from the line sensor 41a is: $\Delta x = \pm(a+b) \cdot p_x$ (a is an integer $\geq 1$, $1 > b \geq 0$), the relative displacement of the line sensors 41b, 41a is corrected by calculation by shifting the light reception data of the respective pixels of the line sensor 41b by the number of pixels corresponding to the displacement in the case that B=0, i.e., the displacement Δx is a multiple of (a times) the pixel pitch $p_x$.

Accordingly, in this case, precise light reception data can be obtained for all pixel positions by replacing the light reception data of the pixels of the line sensor 41a where the output level is saturated by the light reception data of corresponding pixels of the line sensor 41b (corresponding pixels after the displacement is corrected).

On the other hand, in the case that b≠0, i.e., the displacement Δx is not a multiple of the pixel pitch $p_x$, the (k−a−1)th pixel $G_{k-a-1}$ and the (k−a)th pixel $g_{k-a}$ of the line sensor 41b overlap with the k(where k>a+1)th pixel $G_k$ of the line sensor 41a. Thus, in the case that the light reception data of the pixel $g_k$ of the line sensor 41a is saturated, no precise light reception data can be obtained even if the light reception data of the pixel $g_k$ of the line sensor 41a is replaced by that of the pixel $g_{k-a-1}$ or $g_{k-a}$ of the line sensor 41b.

Figure 6:
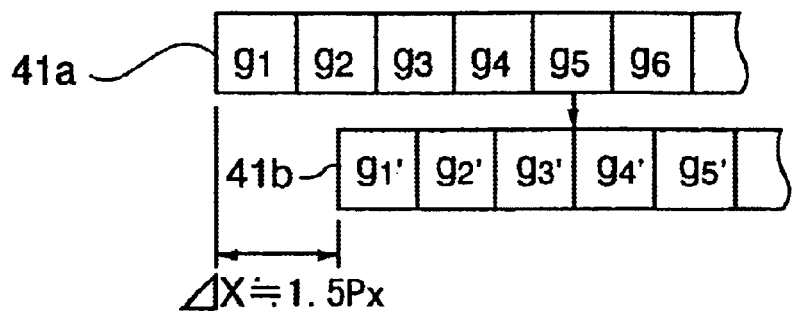
FIG. 6 is a diagram showing an example in which two line sensors are relatively displaced from each other by a non-integer multiple of a pixel interval.
Figure 7:
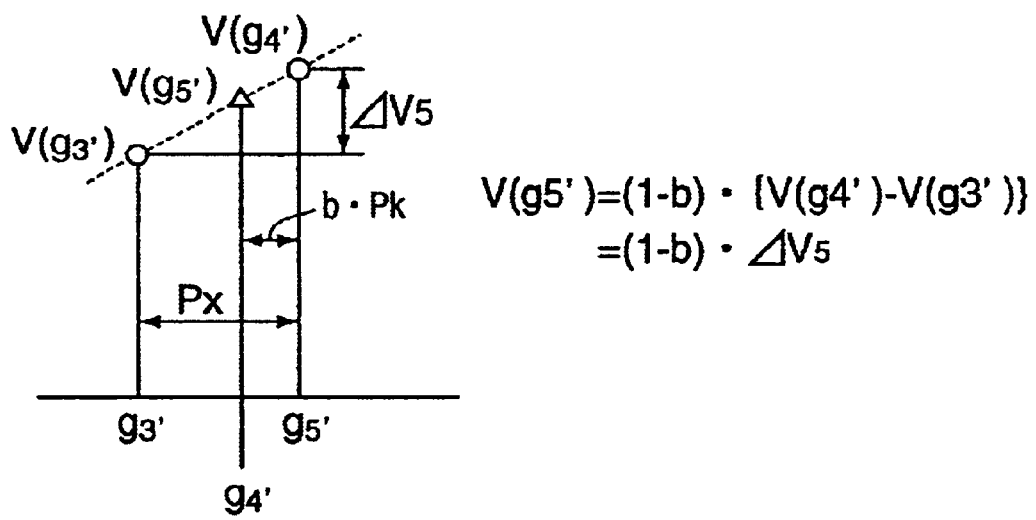
FIG. 7 is a diagram showing a method for interpolating a light reception data corresponding to a position of a pixel $g_5$ using light reception data of pixels $g_3'$ and $g_4'$ in a state of the displacement of FIG. 6.

Specifically, in the case that the displacement Δx is: Δx=(1+b) and the light reception data of the pixel $g_5$ of the line sensor 41a is saturated, for example, as shown in FIG. 6, the third pixel $g_3'$ and the fifth pixel $g_5'$ of the line sensor 41b overlap with the fifth pixel $g_5$ of the line sensor 41a. If, for example, the light reception data of the pixels $g_3'$ and $g_4'$ are as shown in FIG. 7, an error occurs even if a light reception data $V(g_5)$ of the pixel $g_5$ is replaced by a light reception data $V(g_3')$ of the pixel $g_3'$ or a light reception data $V(g_4')$ of the pixel $g_4'$ since the position of the pixel $g_5$ is, precisely speaking, deviated from those of the pixels $g_3'$ and $g_4'$.

Accordingly, in this embodiment, the light reception data at the position of the pixel $g_5$ is calculated by interpolation using the light reception data $V(g_3')$ of the pixel $g_3'$ and the light reception data $V(g_4')$ of the pixel $g_4'$, and the calculation result is used as the light reception data of the pixel $g_5$. This interpolation is, for example, performed to calculate the light reception data corresponding to the position of the pixel $g_5$ between the pixels $g_3'$ and $g_4'$ assuming that the output of the light reception data linearly changes between the pixels $g_3'$ and $g_4'$. Specifically, the light reception data of the pixel $g_5$ is calculated by $V(g_5)=(1-b)\cdot[V(g_4')-V(g_3')]$.

An interpolation value may be an average value of the light reception data $V(g_3')$ of the pixel $g_3'$ and the light reception data $V(g_4')$ of the pixel $g_4'$, i.e., $[V(g_4')-V(g_3')]/2$ assuming that the position of the pixel $g_5$ is located in the middle between the pixels $g_3'$ and $g_4'$.

Thus, in the X-direction displacement corrector 712, the pixel $g_k$ of the line sensor 41a whose light reception data is saturated is calculated, and the light reception data to replace the light reception data of the pixel $g_k$ is calculated using the light reception data of the pixels $g_{k-a-1}'$ and $g_{k-a}'$ of the line sensor 41b.

The data selector 713 generates precise light reception data by combining the light reception data of the respective pixels $g_i$ (i=1, 2, . . . m) of the line sensor 41a and those of the respective pixels $g_i'$ (i=1, 2, . . . m) of the line sensor 41b.

Figure 8:
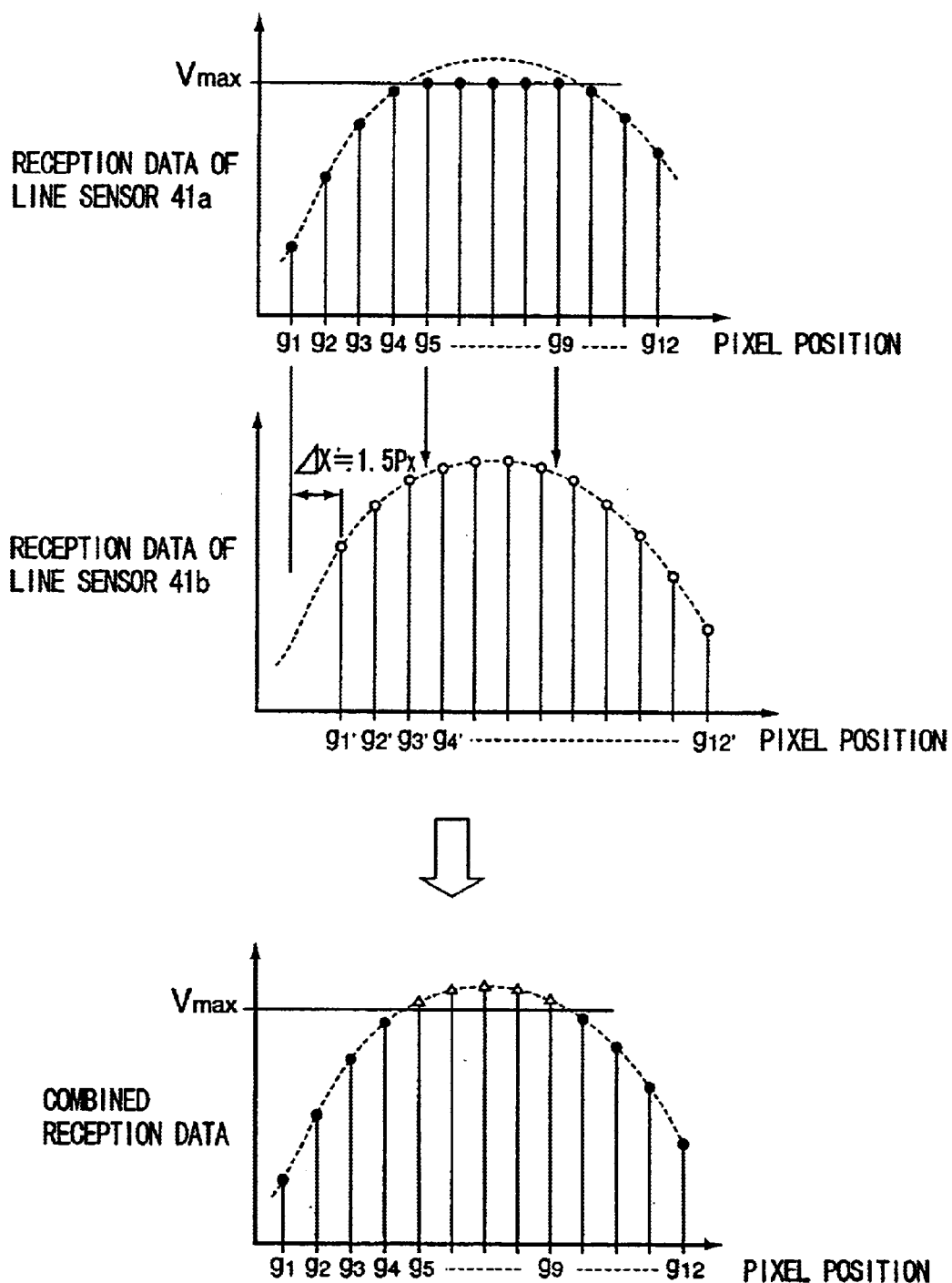
FIG. 8 is a chart showing a method for combining light reception data of two line sensors having different dynamic ranges.

In other words, the light reception data are combined such that the saturated ones of the light reception data of the respective pixels $g_i$ of the line sensor 41a are replaced by the light reception data at the positions of the corresponding pixels of the line sensor 41b as shown in FIG. 8.

FIG. 8 shows an example in which the line sensor 41b is displaced to the right from the line sensor 41a by about 1.5 $p_x$. In order to facilitate the description, the number of the pixels of the line sensors 41a, 41b is assumed to be 12.

An upper part of FIG. 8 shows the light reception data of the pixels $g_1$ to $g_{12}$ of the line sensor 41a, and a middle part of FIG. 8 shows the light reception data of the pixels $g_1'$ to $g_{12}'$ of the line sensor 41b. It should be noted that the level of the light reception data of the line sensor 41b is expressed by being multiplied by N.

In graphs at the upper and middle parts of FIG. 8, dotted-line curves represent light reception level in the case that the line sensors 41a, 41b have a sufficient dynamic range. Since the light reception data of the pixels $g_5$ to $g_9$ exceed the maximum output level Vmax in the line sensor 41a, they are saturated at Vmax. On the other hand, since the amount of incident light is suppressed to 1/N in the line sensor 41b, the output level of any pixel is not saturated at Vmax.

The light reception data of the pixels of the line sensors 41a, 41b are combined by replacing the light reception data of the pixels $g_5$ to $g_9$ of the line sensor 41a by the light reception data at the corresponding pixel positions of the line sensor 41b. In a graph at a lower part of FIG. 8, the levels of the light reception data of the pixels $g_5$ to $g_9$ are indicated by "Δ" in order to shows that they are calculated by the above interpolation since the displacement Δx is not a multiple of the pixel pitch $p_x$. If the displacement Δx is equal to the pixel pitch $p_x$ (Δx=$p_x$), the light reception data of the pixels $g_5$ to $g_9$ are replaced by those of the pixels $g_4'$ to $g_8'$.

The rough data detector 714 detects the light reception data near the peak level from a plurality of light reception data for each pixel position as described above. For example, this device 714 sorts a plurality of light reception data according to the data level for each pixel position, and detects a specified number of light reception data in a decreasing order from the highest level.

The Z-direction displacement corrector 715 corrects a relative displacement Δz of the line sensors 41a, 41b in Z-direction if the sensed light reception data carry errors resulting from such a relative displacement. More precisely, this device 715 corrects errors of the light reception data based on the displacement Δz.

Specifically, if the line sensor 41b is displaced from the line sensor 41a, for example, by a distance Δz in a direction in which the beam is incident as shown in FIG. 13, the amount of the light received by the pixel $g_i$ of the line sensor 41a is smaller than that of the pixel $g_i$ of the line sensor 41b. Accordingly, if the light reception data at the pixel positions near the pixel $g_r$ of the line sensor 41a where the data level is saturated are replaced by the corresponding light reception data of the line sensor 41b, the replaced light reception data have a higher level as compared to a case where the light is sensed at the position of the line sensor 41a.

Figure 9:
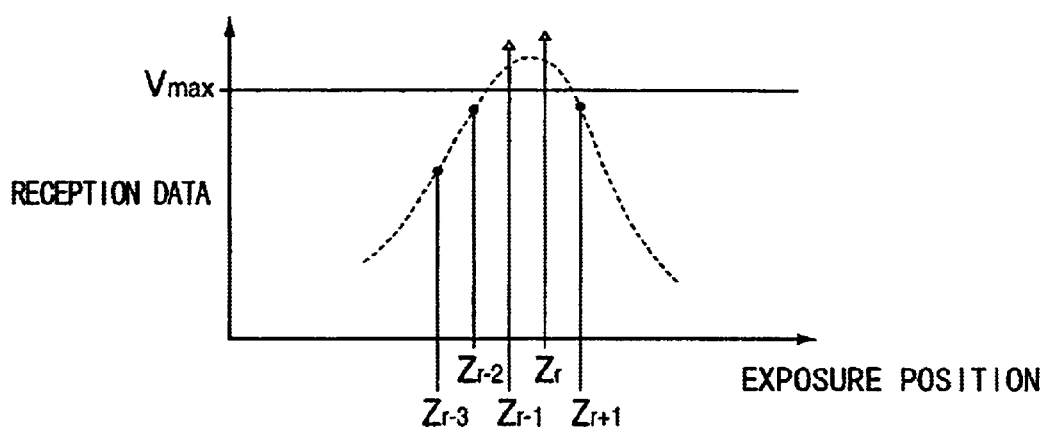
FIG. 9 is a graph showing a content of correction of a Z-direction displacement.

FIG. 9 shows such a state, and a dotted-line curve represents light reception data when the light is sensed at the position of the line sensor 41a without being saturated, "●" represents the light reception data of the line sensor 41a, and "Δ" represents the light reception data of the line sensor 41b.

As shown in FIG. 9, since the light reception data at exposure positions $Z_{r-1}$, $Z_r$ are replaced by the corresponding light reception data of the line sensor 41b, the data levels are above the dotted-line curve. The Z-direction displacement corrector 715 corrects the levels of the light reception data at the exposure positions $Z_{r-1}$, $Z_r$ so that they are located on the dotted-line curve.

The light reception data corrected by the Z-direction displacement corrector 715 are outputted to the measurement control unit 8. The Z-direction displacement correction is also made by correcting the Z-direction displacement Δz of the line sensor 41b from the line sensor 41a, for example, using the position of the line sensor 41a as a reference. The Z-direction displacement Δz is measured when the shape measuring apparatus 1 is produced, and stored in the data memory 716.

Referring back to FIG. 2, the data memory 716 is adapted to store the X-direction and Z-direction displacements Δx, Δz as described above. The displacements Δx, Δz are measured for each pixel position $g_i$ and stored in the data memory 716.

Figure 10:
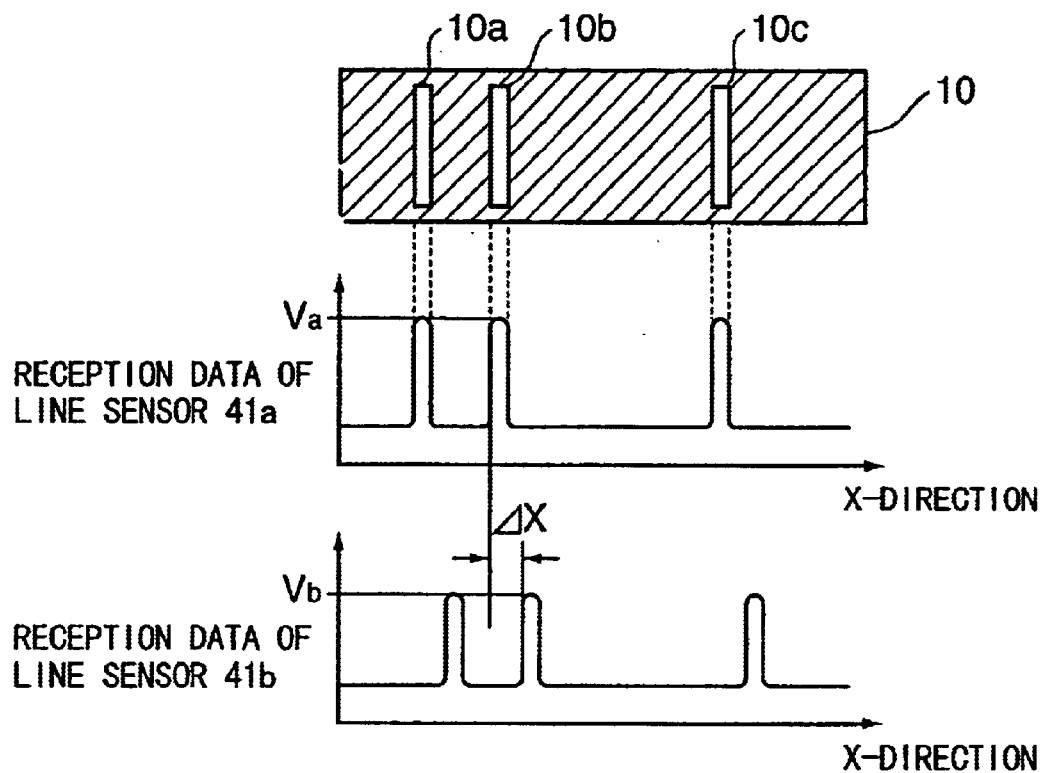
FIG. 10 is a diagram showing a method for measuring an X-direction displacement.

The X-direction displacement Δx is calculated using light reception data outputted from the line sensors 41a, 41b when a test chart 10 formed with a plurality of slits 10a, 10b, 10c at specified intervals in its longitudinal direction, for example, as shown at an upper part of FIG. 10 is placed at the focal point F2 and an image thereof is picked up by the photo-sensor unit 4. Specifically, in the case that the line sensors 41a, 41b are displaced from each other in X-direction, the light reception data outputted from the respective line sensors 41a, 41b are as shown at a middle part and a lower part of FIG. 10. Thus, the relative X-direction displacement Δx of the line sensors 41a, 41b is calculated by, for example, calculating a distance Δx between positions of the pixels of the line sensors 41a, 41b detecting the slit 10b. It should be noted that a reflector plate whose reflectance changes continuously or stepwise in its longitudinal direction may be used as the test chart 10.

The Z-direction displacement Δz is calculated by arranging a full-reflection mirror which has a specified reflectance and serves as a reference instead of the measurement object G in FIG. 3, moving the object-side focal point of the slit beam before and after the reflecting surface of the full-reflection mirror, and comparing light reception data obtained by the line sensors 41a, 41b. Specifically, a distance between the scanning position of the slit beam where the level of the light reception signal from the line sensor 41a is at its maximum and the one where the level of the light reception signal from the line sensor 41b is at its maximum can be calculated as the Z-direction displacement Δz.

Figure 11:
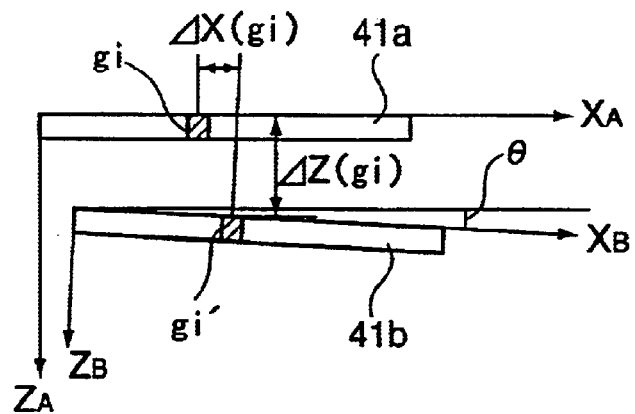
FIG. 11 is a diagram showing X-direction and Z-direction displacements when sensing surfaces of two line sensors are inclined with respect to each other.
Figure 14:
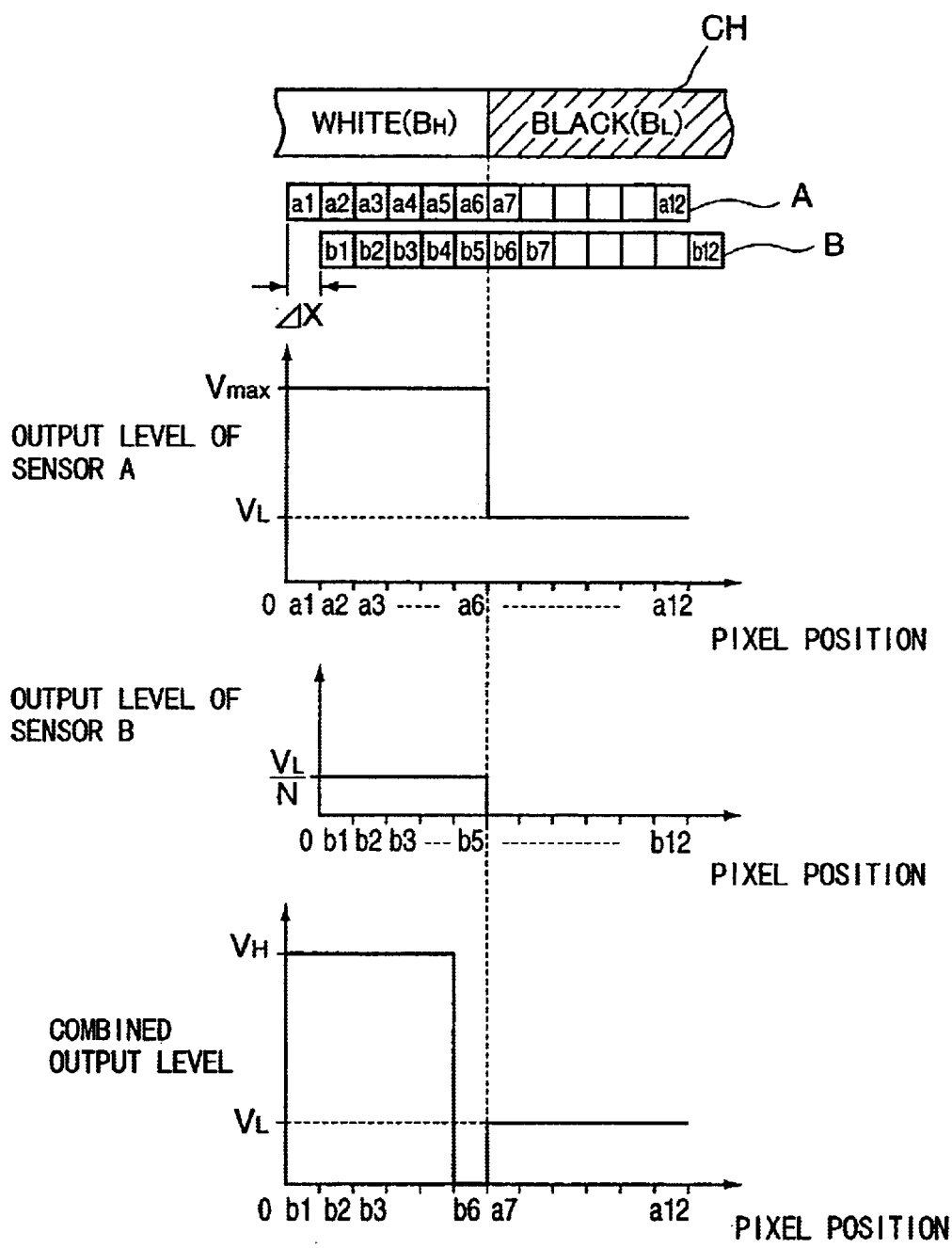
FIG. 14 is a diagram showing an influence on a measurement accuracy when the two line sensors are displaced in a pixel aligning direction.

The displacements Δx, Δz of the line sensors 41a, 41b may be treated as those of the corresponding pairs of pixels of the line sensors 41a, 41b if the sensing surfaces of the line sensors 41a, 41b are parallel to each other. However, if the sensing surface of the line sensor 41a is inclined with respect to that of the line sensor 41b at an angle θ as shown in FIG. 11, the displacements Δx($g_i$), Δz($g_i$) at the respective pixel positions $g_i$ change. Thus, it is desirable to calculate the displacements Δx($g_i$), Δz($g_i$) for each pixel position $g_i$. In such a case, a black-and-white patterned light image may be formed on the line sensors 41a, 41b by using a reflector plate in which a repeating black-and-white pattern is formed in its longitudinal direction as the test chart 10 or moving a test chart formed with one slit in X-direction, and the displacement Δx($g_i$) may be calculated for each pixel position $g_i$ using the sensed images. In this embodiment, the displacements Δx($g_i$), Δz($g_i$) are stored in the data memory 716 for each pixel position $g_i$.

Since the second data processor 72 prioritizes a high-speed measurement even if it results in slightly reduced accuracy of the displacement correction, a specified representing value, i.e., an average value of the displacements $\Delta z(g_i)$ of all pixels $g_i$ is used as the displacement $\Delta z(g_i)$ of each pixel $g_i$ in the Z-direction displacement corrector 724 as described later. In this way, a memory capacity for storing the displacements $\Delta z(g_i)$ for the Z-direction displacement corrector 724 is reduced and the calculation is speeded up.

The second data processor 72 processes the light reception data in the second measurement mode and includes an X-direction pixel displacement corrector 721, a data selector 722, an image memory 723, and a Z-direction displacement corrector 724. The second data processor 72 is constructed by hardware such as a CPLD (Complex Programmable Logic Device) or a FPGA (Field Programmable Gate Array).

The first measurement mode is designed to maximally reduce a measurement error by precisely calculating the X-direction displacement, whereas the second measurement mode is designed to enable a high-speed measurement by correcting the X-direction displacements by the pixel pitch.

In the second measurement mode, the displacement is corrected by signal processing while being assumed that it is a multiple of the pixel pitch $p_x$ even in the case that the X-direction displacement between the line sensor 41a and the line sensor 41b is not a multiple of the pixel pitch $p_x$. Therefore, since the displacement is not corrected by calculation, processing can be speeded up. Further, since only the light reception data combined after correcting the X-direction displacement are stored without storing all the light reception data of the line sensors 41a, 41b, the memory capacity can be reduced as compared to the first measurement mode.

The X-direction pixel displacement corrector 721 is adapted to correct the X-direction displacement between the line sensors 41a and 41b by the pixel pitch as described above. The corrector 721 corrects the X-direction displacement by relatively shifting the phase of a group of light reception data read from the line sensor 41a and that of a group of light reception data read from the line sensor 41b every time exposure is made.

Specifically, the light reception data $V(g_i)$, $V(g_i')$ outputted from the pixels $g_i$, $g_i'$ of the line sensors 41a, 41b are outputted at the same phase from the photo-sensor unit 4. For example, in the case that the X-direction displacement $\Delta x$ between the line sensors 41a and 41b is: $\Delta x \approx 1.5\ p_x$ as shown in FIG. 8, the sensing position of the pixel $g_i'$ is displaced in X-direction from that of the pixel $g_i$ by 1.5 $p_x$ and is closer to the sensing position of the pixel $g_{i+1}$ or $g_{i+2}$.

Accordingly, in the X-direction pixel displacement corrector 721, the X-direction displacement is corrected by such a signal processing that the phase of the light reception data $V(g_i')$ outputted from the line sensor 41b is delayed by one or two pixels so as to be the same as that of the light reception data $V(g_{i+1})$ or $V(g_{i+2})$ outputted from the pixel $g_{i+1}$, $g_{i+2}$ of the line sensor 41a.

The data selector 722 generates precise light reception data by combining the light reception data of the respective pixels $g_i$ (i=1, 2, ... m) of the line sensor 41a and those of the respective pixels $g_i'$ (i=1, 2, ... m) of the line sensor 41b, and have the same function as the data selector 713 in the first data processor 71. In the data selector 722, the light reception data from the line sensor 41a and those from the line sensor 41b are compared, and suitable light reception data whose levels are not saturated are selected and stored in the image memory 723.

The image memory 723 is adapted to temporarily store the combined light reception data. The image memory 723 has the same or similar memory capacity as the image memory 711a (or 711b) provided in the first data processor 71, and the light reception data $V(g_i)$ at the respective pixel positions are stored therein as shown in FIG. 5.

The Z-direction displacement corrector 724 has the same function as the rough data detector 714 and the Z-direction displacement corrector 715 provided in the first data processor 71. Specifically, the light reception data near the peak level are detected from a plurality of light reception data for each pixel position, and the relative Z-direction displacement $\Delta z$ of the line sensors 41a, 41b is corrected for the light reception data if the light reception data of the line sensor 41b are included among the detected light reception data. The light reception data corrected by the Z-direction displacement corrector 715 are outputted to the measurement control unit 8.

A specific value is set as the displacement $\Delta z$ for the respective pixel positions in the Z-direction displacement corrector 724, and the signal levels are corrected based on the same Z-direction displacement $\Delta z$. This enables the calculation to be speeded up.

Since the specific processing of the Z-direction displacement corrector 724 is the same as that of the aforementioned rough data detector 714 and Z-direction displacement corrector 715, no specific description is given here.

The light reception data roughly detected in Z-direction which are outputted from the first data processor 71 or the second data processor 72 are inputted to the measurement control unit 8, and a Z-coordinate where the precise signal level is at its maximum is calculated by interpolation in the Z-coordinate calculator 84.

As described above, since the shape measuring apparatus 1 according to this embodiment is provided with the photo-sensor unit 4 adopting the dynamic range enlarging method by the dual CCD system, highly accurate light reception data can be obtained, thereby enabling a highly accurate measurement of the shape. Particularly, the X-direction and Z-direction displacements $\Delta x$, $\Delta z$ between the line sensors 41a and 41b are calculated for each pixel, and an error resulting from the displacement of the light reception data of the line sensor 41b from those of the line sensor 41a is corrected pixel by pixel. Thus, the X-direction and Z-direction displacements $\Delta x$, $\Delta z$ between the line sensors 41a and 41b influence the measurement error to a small degree.

Further, the first measurement mode attaching importance to the measurement accuracy and the second measurement mode attaching importance to the measurement speed are provided, and a user can select one measurement mode from these two modes depending on a purpose of measurement. Therefore, the shape measuring apparatus can be more conveniently used.

Although the first and second measurement modes are switchable in the foregoing embodiment, a measurement error based on the X-direction and Z-direction displacements $\Delta x$, $\Delta z$ between the line sensors 41a and 41b can also be reduced by a shape measuring apparatus provided with either one of the above measurement modes although the measurement accuracy differs.

In the foregoing embodiment, the dynamic range of the photo-sensor unit 4 is enlarged using the two line sensors. However, even in the case that three or more line sensors are used, the influence of displacements between the line sensors on the measurement error can be reduced if displacements are corrected by a similar method. Further, if displacements are also corrected by a similar method in the case that a single sensor or a single area sensor, the influence of displacements between the line sensors on the measurement error can be reduced.

In the foregoing embodiment, the light reception data are combined after the X-direction displacement is corrected, and then the Z-direction displacement is corrected. However, the light reception data may be combined after the X-direction displacement and the Z-direction displacement are corrected.

Furthermore, the confocal optical system 3 is used, the light source for illumination is provided at the image-side focal point F1 and an illumination light is projected onto the measurement object G via the optical system 3 in the foregoing embodiment. However, the light source for illumination may be provided in a position deviated from the light path of the optical system 3, and the light emitted from this light source and reflected by the measurement object G may be introduced to the photo-sensor unit 4 by the optical system 3.

As described above, a shape measuring apparatus is provided with at least two photo-sensors for converting received light to electrical light reception signals, one photo-sensor having a photo-sensing characteristic identical to another photo-sensor, a first beam splitter for splitting a light beam in a predetermined light amount ratio, and introducing split light beams to the photo-sensors, respectively, an optical system for introducing a light beam reflected from an object to be measured to the beam splitter, and having a focal point movable in relative to the object, a driver for driving the optical system to move the focal point, a signal processing section for executing combination processing to light reception signals outputted from the photo-sensors.

The signal processing section includes a first displacement memory for storing a relative displacement between one photo-sensor and another photo-sensor in an incident direction (or a direction perpendicular to the incident direction), a signal memory for storing light reception signals outputted from each of the photo-sensors, a first corrector for correcting errors of light reception signals from one photo-sensor with respect to light reception signals from another photo-sensor in the incident direction (or perpendicular direction) based on the relative displacement stored in the first displacement memory, and a signal processor for combining light reception signals from one photo-sensor with light reception signals from another photo-sensor by replacing light reception signals from a saturated part of one photo-sensor with light reception signals from a corresponding part of another photo-sensor. Accordingly, the shape measuring apparatus can measure an outer shape of a measurement object more accurately because the displacement between the photo-sensors are eliminated.

Alternatively, a shape measuring apparatus is provided with at least two photo-sensors, each photo-sensor including a number of pixels arranged in a specified direction for converting received light to electrical light reception signals, one photo-sensor having a photo-sensing characteristic identical to another photo-sensor, a beam splitter for splitting a light beam in a predetermined light amount ratio, and introducing split light beams to the photo-sensors, respectively, an optical system for introducing a light beam reflected from an object to be measured to the beam splitter, and having a focal point movable in relative to the object, a driver for driving the optical system to move the focal point, first and second signal processing sections for executing combination processing to light reception signals outputted from the photo-sensors in their respective manners, a changer for changing over the first signal processing section and the second signal processing section, a mode setter for switchingly setting a first measurement mode and a second measurement mode, and a controller responsive to the mode setter for rendering the first signal processing section execute the combination processing when the first measurement mode is set, and rendering the second signal processing section execute the combination processing when the second measurement mode is set.

The first signal processing section includes a first displacement memory for storing a relative displacement between one photo-sensor and another photo-sensor in the pixel arrangement direction (or incident direction perpendicular to the pixel arrangement direction), a first signal memory for storing light reception signals outputted from each of the photo-sensors, a first corrector for correcting errors of light reception signals from one photo-sensor with respect to light reception signals from another photo-sensor in the pixel arrangement direction (or the incident direction) based on the relative displacement stored in the first displacement memory, and a signal processor for combining light reception signals from one photo-sensor with light reception signals from another photo-sensor by replacing light reception signals from saturated pixels of one photo-sensor with light reception signals from corresponding pixels of another photo-sensor.

The second signal processing section includes a corrector for correcting a relative displacement between one photo-sensor and another photo-sensor in the pixel arrangement direction (or the incident direction) by a pitch of pixel by delaying the sending of the reception signals from one photo-sensor with respect to the sending of the reception signals from another photo-sensor, and a signal processor for combining light reception signals from one photo-sensor with light reception signals from another photo-sensor by replacing light reception signals from saturated pixels of one photo-sensor with light reception signals from corresponding pixels of another photo-sensor.

This construction makes it possible to select the first mode for accurate measurement and the second mode for high speed measurement, and thus places the shape measuring apparatus in wider application.

The signal processing section may be further provided with a second displacement memory for storing a relative displacement between one photo-sensor and another photo-sensor in the perpendicular direction (or the incident direction), and a second corrector for correcting light reception signal errors resulting from the relative displacement in the direction perpendicular (or the incident direction) based on the relative displacement stored in the second displacement memory. The measurement accuracy can be more improved.

Each of the photo-sensors may be constructed by a number of pixels arranged in the direction perpendicular to the incident direction. The correction may be performed for each pixel. The relative displacement in the incident direction and the relative displacement in the perpendicular direction each may be a single value applicable for all the pixels. These modifications can simplify the correction to assure speedy measurement.

Each of the photo-sensors is provided at another focal point of the optical system. There may be further provided a light source at another focal point of the optical system to generate illumination light for illuminating the object, and a second beam splitter between the light source and the photo-sensors to introduce the illumination light to the optical system, and reflected light from the object to the first beam splitter. In this construction, more accurate measurement can be attained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A shape measuring apparatus comprising:
   at least two photo-sensors for converting received light to electrical light reception signals, one photo-sensor having a photo-sensing characteristic identical to another photo-sensor;
   a first beam splitter which splits a light beam in a predetermined light amount ratio, and introduces split light beams to the photo-sensors, respectively;
   an optical system which introduces a light beam reflected from an object to be measured to the beam splitter, and has a focal point movable relative to the object;
   a driver which drives the optical system to move the focal point;
   a signal processing section which executes combination processing to light reception signals outputted from the photo-sensors, the signal processing section including:
      a first displacement memory which stores a relative displacement between one photo-sensor and another photo-sensor in an incident direction;
      a signal memory which stores light reception signals outputted from each of the photo-sensors;
      a first corrector which corrects errors of light reception signals from one photo-sensor with respect to light reception signals from another photo-sensor in the incident direction based on the relative displacement stored in the first displacement memory; and
      a signal processor which combines light reception signals from one photo-sensor with light reception signals from another photo-sensor by replacing light reception signals from a saturated part of one photo-sensor with light reception signals from a corresponding part of another photo-sensor.

2. A shape measuring apparatus according to claim 1, wherein the signal processing section further comprises:
   a second displacement memory which stores a relative displacement between one photo-sensor and another photo-sensor in a direction perpendicular to the incident direction; and
   a second corrector which corrects light reception signal errors resulting from the relative displacement in the direction perpendicular to the incident direction based on the relative displacement stored in the second displacement memory.

3. A shape measuring apparatus according to claim 2, wherein each photo-sensor includes a number of pixels arranged in the direction perpendicular to the incident direction.

4. A shape measuring apparatus according to claim 3, wherein the first and second correctors execute the correction for each pixel.

5. A shape measuring apparatus according to claim 4, wherein the relative displacement in the incident direction and the relative displacement in the perpendicular direction each are a single value applicable for all the pixels.

6. A shape measuring apparatus according to claim 1, wherein each photo-sensor includes a number of pixels arranged in the direction perpendicular tot he incident direction.

7. A shape measuring apparatus according to claim 1, wherein each of the photo-sensors is provided at another focal point of the optical system, further comprising:
   a light source which is provided at another focal point of the optical system to generate illumination light for illuminating the object; and
   a second beam splitter which is provided between the light source and the photo-sensors to introduce the illumination light to the optical system, and reflected light from the object to the first beam splitter.

8. A shape measuring apparatus comprising:
   at least two photo-sensors for converting received light to electrical light reception signals, one photo-sensor having a photo-sensing characteristic identical to another photo-sensor;
   a first beam splitter which splits a light beam in a predetermined light amount ratio, and introduces split light beams to the photo-sensors, respectively;
   an optical system which introduces a light beam reflected from an object to be measured to the beam splitter, and has a focal point movable relative to the object;
   a driver which drives the optical system to move the focal point;
   a signal processing section which executes combination processing tot light reception signals outputted from the photo-sensors, the signal processing section including:
      a first displacement memory which stores a relative displacement between one photo-sensor and another photo-sensor in a direction perpendicular to an incident direction;
      a signal memory which stores light reception signals outputted from each of the photo-sensors;
      a first corrector which corrects errors of light reception signals from one photo-sensor with respect to light reception signals from another photo-sensor in the perpendicular direction based on the relative displacement stored in the first displacement memory; and
      a signal processor which combines light reception signals from one photo-sensor with light reception signals from another photo-sensor by replacing light reception signals from a saturated part of one photo-sensor with light reception signals from a corresponding part of another photo-sensor.

9. A shape measuring apparatus according to claim 8, wherein each photo-sensor includes a number of pixels arranged in the direction perpendicular to the incident direction.

10. A shape measuring apparatus according to claim 9, wherein the first corrector executes the correction for each pixel.

11. A shape measuring apparatus according to claim 8, wherein each of the photo-sensors is provided at another focal point of the optical system, further comprising:
   a light source which is provided at another focal point of the optical system to generate illumination light for illuminating the object; and
   a second beam splitter which is provided between the light source and the photo-sensors to introduce the illumination light to the optical system, and reflected light from the object to the first beam splitter.

12. A shape measuring apparatus comprising:
- at least two photo-sensors, each photo-sensor including a number of pixels arranged in a specified direction for converting received light to electrical light reception signals, one photo-sensor having a photo-sensing characteristic identical to another photo-sensor;
- a beam splitter which splits a light beam in a predetermined light amount ratio, and introduces split light beams to the photo-sensors, respectively;
- an optical system which introduces a light beam reflected from an object to be measured to the beam splitter, and has a focal point movable relative to the object;
- a driver which drives the optical system to move the focal point;
- a first signal processing section which executes combination processing to light reception signals outputted from the photo-sensors, the first signal processing section including:
  - a first displacement memory which stores a relative displacement between one photo-sensor and another photo-sensor in the pixel arrangement direction;
  - a first signal memory which stores light reception signals outputted from each of the photo-sensors;
  - a first corrector which corrects errors of light reception signals from one photo-sensor with respect to light reception signals from another photo-sensor in the pixel arrangement direction based on the relative displacement stored in the first displacement memory; and
  - a signal processor which combines light reception signals from one photo-sensor with light reception signals from another photo-sensor by replacing light reception signals from saturated pixels of one photo-sensor with light reception signals from corresponding pixels of another photo-sensor;
- a second signal processing section which executes combination processing to light reception signals outputted from the photo-sensors, the second signal processing section including:
  - a corrector which corrects a relative displacement between one photo-sensor and another photo-sensor in the pixel arrangement direction by a pitch of pixel by delaying the sending o the reception signals from one photo-sensor with respect to the sending of the reception signals from another photo-sensor; and
  - a signal processor which combines light reception signals from one photo-sensor with light reception signals from another photo-sensor by replacing light reception signals from saturated pixels of one photo-sensor with light reception signals from corresponding pixels of another photo-sensor;
- a changer which changes over the first signal processing section and the second signal processing section;
- a mode setter which switchingly sets a first measurement mode and a second measurement mode; and
- a controller which is responsive to the mode setter to render the first signal processing section execute the combination processing when the first measurement mode is set, and render the second signal processing section execute the combination processing when the second measurement mode is set.

13. A shape measuring apparatus according to claim 12, wherein each of the first and second signal processing sections further comprises:
- a second displacement memory which stores a relative displacement between one photo-sensor and another photo-sensor in an incident direction; and
- a second corrector which corrects light reception signal errors resulting from the relative displacement in the incident direction based on the relative displacement stored in the second displacement memory.

14. A shape measuring apparatus according to claim 13, wherein the first and second correctors of the first signal processing section execute the correction for each pixel.

15. A shape measuring apparatus according to claim 14, wherein the relative displacement in the pixel arrangement direction and the relative displacement in the incident direction each are a single value applicable for all the pixels.

16. A shape measuring apparatus according to claim 12, wherein the first and second correctors of the first signal processing section execute the correction for each pixel.

17. A shape measuring apparatus according to claim 12, wherein each of the photo-sensors is provided at another focal point of the optical system, further comprising:
- a light source which is provided at another focal point of the optical system to generate illumination light for illuminating the object; and
- a second beam splitter which is provided between the light source and the photo-sensors to introduce the illumination light to the optical system, and reflected light from the object to he first beam splitter.

18. A shape measuring apparatus comprising:
- at least two photo-sensors, each photo-sensor including a number of pixels arranged in a specified direction for converting received light to electrical light reception signals, one photo-sensor having a photo-sensing characteristic identical to another photo-sensor;
- a beam splitter which splits a light beam in a predetermined light amount ratio, and introduces split light beams to the photo-sensors, respectively;
- an optical system which introduces a light beam reflected from an object to be measured to the beam splitter, and has a focal point movable relative to the object;
- a driver which drives the optical system to move the focal point;
- a first signal processing section which executes combination processing to light reception signals outputted from the photo-sensors, the first signal processing section including:
  - a first displacement memory which stores a relative displacement between one photo-sensor and another photo-sensor in an incident direction;
  - a first signal memory which stores light reception signals outputted from each of the photo-sensors;
  - a first corrector which corrects errors of light reception signals from one photo-sensor with respect to light reception signals from another photo-sensor in the incident direction based on the relative displacement stored in the first displacement memory; and
  - a signal processor which combines light reception signals from one photo-sensor with light reception signals from another photo-sensor by replacing light reception signals from saturated pixels of one photo-sensor with light reception signals from corresponding pixels of another photo-sensor;
- a second signal processing section which executes combination processing to light reception signals outputted from the photo-sensors, the second signal processing section including:
  - a corrector which corrects a relative displacement between one photo-sensor and another photo-sensor in the incident direction by a pitch of pixel by delaying the sending of the reception signals from one photo-sensor with respect to the sending of the reception signals from another photo-sensor; and a signal processor which combines light reception signals from one photo-sensor with light reception signals from another photo-sensor by replacing light reception signals from saturated pixels of one photo-sensor with light reception signals from corresponding pixels of another photo-sensor;

a changer which changes over the first signal processing section and the second signal processing section;

a mode setter which switchingly sets a first measurement mode and a second measurement mode; and a controller which is responsive to the mode setter to render the first signal processing section execute the combination processing when the first measurement mode is set, and render the second signal processing section execute the combination processing when the second measurement mode is set.

19. A shape measuring apparatus according to claim 18, wherein the first and second correctors of the first signal processing section execute the correction for each pixel.

20. A shape measuring apparatus according to claim 18, wherein the relative displacement in the incident direction is a single value applicable for all the pixels.

21. A shape measuring apparatus according to claim 18, wherein each of the photo-sensors is provided at another focal point of the optical system, further comprising:

a light source which is provided at another focal point of the optical system to generate illumination light for illuminating the object; and a second beam splitter which is provided between the light source and the photo-sensors to introduce the illumination light to the optical system, and reflected light from the object to the first beam splitter.

* * * * *